United States Patent [19]

Hoffelner

[11] Patent Number: 5,026,252
[45] Date of Patent: Jun. 25, 1991

[54] SEALING DEVICE FOR TURBO ENGINES AND THE LIKE

[75] Inventor: Herbert Hoffelner, Markt Indersdorf, Fed. Rep. of Germany

[73] Assignee: MTU Motoren- und Turbinen- Union München GmbH, Fed. Rep. of Germany

[21] Appl. No.: 396,354

[22] Filed: Aug. 21, 1989

[30] Foreign Application Priority Data

Aug. 20, 1988 [DE] Fed. Rep. of Germany ....... 3828363

[51] Int. Cl.$^5$ .............................................. F04D 29/08
[52] U.S. Cl. .................................. 415/174.2; 277/53; 277/55
[58] Field of Search ............... 415/174.2, 173.7, 170.1; 277/53, 55, 56

[56] References Cited

U.S. PATENT DOCUMENTS

| Re. 30,206 | 2/1980 | Ferguson et al. | 415/173.7 |
|---|---|---|---|
| 4,358,120 | 11/1982 | Moore | 277/53 |
| 4,415,309 | 11/1983 | Atterburg | 415/173.7 |
| 4,541,741 | 9/1985 | Woodbridge et al. | 277/53 |
| 4,595,207 | 6/1986 | Popp | 277/53 |
| 4,678,113 | 7/1987 | Bridges et al. | 277/53 |
| 4,756,536 | 7/1988 | Belcher | 277/53 |
| 4,781,388 | 11/1988 | Wohrl et al. | 277/53 |

FOREIGN PATENT DOCUMENTS 3429708 1/1986 Fed. Rep. of Germany.

OTHER PUBLICATIONS

European Patent 199,322, Oct. 1986.

Primary Examiner—John T. Kwon
Attorney, Agent, or Firm—Evenson, Wands, Edwards, Lenahan & McKeown

[57] ABSTRACT

A sealing device is provided, specifically between engine spaces which fluidically are acted upon by a different pressure, particularly for turbo-engines, such as gas turbo-engines. The sealing device includes at least one brush sealing device non-rotatably anchored at the stator side, the free bristle ends of this brush sealing device being guided in the direction toward an engine rotor. In this case, the brush sealing device is to be constructed as a radial sliding ring sealing device. The free ends of the bristles, while forming a secondary sealing, are guided in a circumferential groove of a sliding ring which is separated at least at one circumferential point, and which, on the side facing away from the bristles, forms a self-centering primary sealing at the engine rotor.

12 Claims, 1 Drawing Sheet (P1>P2)

(P1>P2)

SEALING DEVICE FOR TURBO ENGINES AND THE LIKE

BACKGROUND AND SUMMARY OF THE INVENTION

The invention relates to a sealing arrangement for sealing between two pressure spaces of a turbo-engine or the like, utilizing a brush sealing device non-rotatably anchored at a stator with free bristle ends guided toward a rotor.

From EP-A 0199322, a brush sealing device is known for bridging a gap between two stationary components which are subjected to thermal or other deformations and forces or movements. In this case, the bristles of the brush sealing device are to be freely movably guided at one end with the one component and with the other free end in a joint of the other component. The known case does not concern a brush sealing device which is suitable and constructed for the sealing of a radial gap between a rotor and a stator.

From U.S. RE No. 30,206, a use (FIG. 4) of a brush sealing device as well as a manufacturing process of the sealing device (FIGS. 1 to 3) is known. According to the use, for example, in a turbo-engine, the sealing element, which is constructed as a brush, is to be fixedly anchored on one side at the stator and by means of the other free end is to sit loosely on the rotor. In this manner, differential expansions between the rotor and the stator which particularly are caused thermally from nonsteady operating conditions, are to be sealingly compensated while the seal leakage flow is minimal.

For producing this brush sealing device in this known case, the brush bundle is first folded together and is then inserted on the side of the folding into bores of a first ring and is wired to it. The exterior open ends of the brush bundles, which partially overlap one another in circumferential direction, must then be clamped into a circumferential recess of a second ring which is coaxially assigned to the first ring and are to be welded in there. As a result of the center-coaxial cutting-through of the brush bundle, the remainder of the brush containing the foldings, including the first ring, must then be removed completely so that the remaining brush part which is fixedly bound into the second ring will form the discussed brush sealing device (FIG. 4) having bristle ends which are free toward the outside and sit on the rotor in an unguided manner.

In practice, an important advantage of such a brush sealing device arranged between the rotor and the stator is the fact that, particularly in view of nonsteady operating conditions of a turbo-engine, such as a gas turbine engine, it is capable of compensating thermally caused radial gap changes between the stator and the rotor without the danger of a direct contacting of the material and wear of material and, in the extreme case, danger of breakage of the sealing device, as in the case of conventional labyrinth seals. However, as a result of a continuous frictional contacting, a brush sealing device as well as its pertaining counterface (rotor) is also subjected to extensive material wear, for which, among other things, special coatings have been suggested on the rotor side. However, in each of these cases, an abrasion of the brush or the coating must be expected which leads to considerable impurities in the media to be sealed off. The quality, the wear and the abrasion of the brush sealing devices, among other things, depend significantly on the selection of the material for the bristles of the sealing device. For this purpose, locally different bristle materials are known in that an elastic bristle core (glass, metal, plastic) is to be coated in complicated coating processes (PVD, CVD) with materials (such as gold, silver, nickel) which are as abrasion-resistant as possible, but expensive (see German Patent DE-PS 3429708).

In addition, radial slide ring sealing devices are known by themselves which basically consist of a housing, the sliding ring, an element which is elastic in axial direction and of the pertaining shaft or the pertaining shaft section. In this case, the sliding ring is sealingly guided in the housing between a supporting shoulder of the housing on one side and a spring plate which, for example, is movable on the other side under the effect of the spring element (secondary sealing). As the primary sealing, a relatively small radial sealing gap is to be maintained between the sliding ring and the shaft.

In addition to having a comparatively expensive and trouble-prone construction, sliding ring sealing devices of this type have the disadvantage of a comparatively high sealing leakage flow, particularly, if, in view of nonsteady operating conditions, comparably large radial gaps (primary sealing) must be taken into account in order to in turn counteract a wear caused by a mutual material contacting between the sliding ring and shaft.

Such radial sliding ring sealing devices cannot meet any perfect sealing requirements, particularly if the object is a sealing-off of bearing spaces in gas turbines with respect to the engine inlet or the local ambient air surroundings or with respect to the exhaust flow, thus bearing spaces which normally have a significantly lower pressure level than the bearing space in front of the sealing device.

Sliding ring sealing concepts in a multiple arrangement behind one another (labyrinth construction) which have been suggested in order to eliminate this deficiency, have the additional disadvantage of a considerable installation space requirement.

An object of the invention to provide a sealing device of the initially mentioned type which, while utilizing the advantages of a brush sealing concept (among others, suspension, damping), operates practically without any wear and therefore without any abrasion. Within the scope of this object, a sealing device will therefore be provided which is suitable for the perfect sealing-off of spaces acted upon by media, such as fluids and/or gases with comparatively high differential pressures, and, at the same time, is characterized by a comparatively small installation volume and a comparatively simple and trouble free construction.

This object is achieved according to the invention by providing an arrangement with at least one sliding sealing ring surrounding a rotor shaft and at least one brush sealing device fixedly held at a stator and having free brush bristle ends sealingly guided in the at least one sliding sealing ring. Thus a basic idea of the invention relates to an advantageous combination of a brush sealing device and a radial sliding ring sealing device. The sealing device is constructed such that the shaft with the at least one radial sliding ring represents the primary sealing point or primary sealing. The sliding ring is equipped at the circumference with at least one point of separation and is elastically disposed at the inside diameter of the bristles of the brush sealing device. Thus, together with the brush bundle, the sliding ring forms the secondary sealing point or secondary sealing. By means of a slight overlapping of the bristles of the brush sealing device at their open bristle ends or at the inside diameter, the sliding ring can rest in the inoperative position against the shaft circumference.

When the shaft rotates, an aerodynamic pressure or pressure cushion can therefore build up in the primary sealing gap which keeps the frictional losses of the sliding ring to a minimum. Radial rotor deflections are absorbed and damped by way of the bristles of the brush sealing device which are constructed as a springing element.

Basically, both rotating directions of the shaft are possible with certain preferred embodiments of the invention. In this case, the sliding ring is prevented from rotating along by the frictional forces of the bristles. However, when the shaft is rotated in the direction of the respective brush incidence or the respective angle of brush incidence, it may slowly move into the rotating direction. "brush incidence" means that, when the sealing device is arranged in a common axial plane, the bristles are set with respect to a radial plane of symmetry, with respect to a stator/rotor axis, in each case in a diagonal cut of the mentioned plane over the circumference of the sealing device. The pressure to be sealed off causes the sliding ring to axially place itself at the brush bundle. Thus, in addition, to a higher frictional force, an optimum packing density of the brush sealing device is achieved which has a very favorable effect on the leakage of the sealing device (secondary sealing).

In order to control the comparatively high pressure differences, several sealing devices may be arranged next to one another. By means of the suitable construction of the sliding ring, a changing pressure admission at the sealing unit can be controlled.

By means of the sealing device according to the invention, the following advantages are achieved with respect to manufacturing and operating characteristics:

Simpler and More Cost-Effective Manufacturing of the Brush Sealing Device

In the case of a conventionally constructed brush sealing device (see German Published Unexamined Patent Application OS-E-30 206), much attention must be paid to the packing density of the bristles. This is no longer necessary now that a good packing density is achieved by wa of the differential pressure by means of the sliding ring at the bristles of the brush sealing device.

The bristle ends no longer have to be smoothed. The brush diameter may be dimensioned by means of punching or eroding.

Since the brush does not contact any rotating component, it is sufficient to select a material of a lower quality.

The angle of incidence of the bristles of the brush sealing device may be selected to be relatively small and have a tolerance range which is higher in comparison to conventional concepts.

Simpler and More Cost-Effective Manufacturing of the Rotor Surface

Ceramic starting coatings are not required. No contamination of the oil for example takes place by ceramic abrasion in the case of bearing chamber sealing devices. A hardened, nitrified or chrome-plated surface is sufficient.

Facilitated Handling

The bristle ends are well protected by the sliding ring.

During the mounting and the operation, both rotating directions are basically possible.

Lower Cost of Repairing the Sealing Device

The brush is not subjected to wear.

The sliding ring can be manufactured at low cost and can be exchanged easily.

Optimal Operating Characteristics

An aerodynamic pressure builds up between the sliding ring and the shaft which considerably reduces the frictional losses. As a result of the slotted sliding ring, the gap can adjust itself (primary sealing).

The bristles of the brush sealing device are used as a secondary sealing and as a spring/damper. The spring/damper can be optimally adjusted, specifically by, for example, a varying packing density of the bristles (overlapping density of the free bristle ends at the inside diameter of the brush sealing device; selection of the initially defined angle of incidence of the bristles, or variable packing density or the given number of bristles with respect to the outside and inside diameter of the bristles of the brush sealing device).

Other objects, advantages and novel features of the present invention will become apparent from the following detailed description of the invention when considered in conjunction with the accompanying drawings.

DETAILED DESCRIPTION OF THE DRAWINGS

Figure 1:
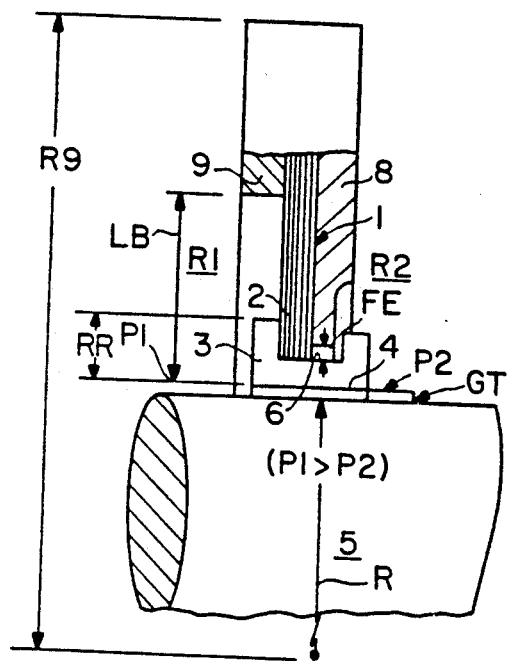
FIG. 1 is a partial sectional view along the longitudinal center plane of a turbo-engine showing a first embodiment of a sealing device constructed according to the invention.
Figure 3:
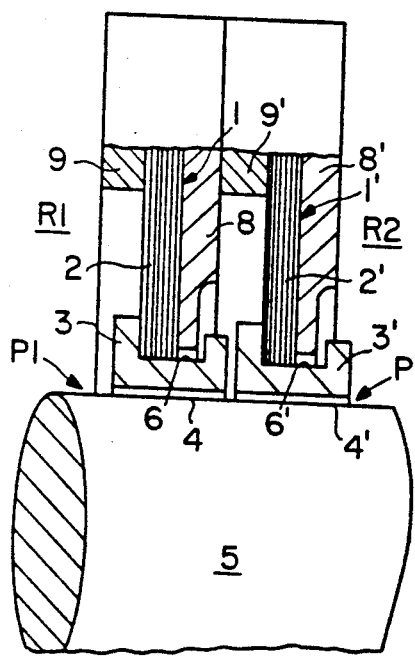
FIG. 3 is a partial sectional view along the longitudinal center axis of a turbo-engine of a second embodiment of the sealing device, showing a sealing device with two successive sliding rings connected successively in the manner of a labyrinth in order to cope with relatively large pressure differences.
Figure 4:
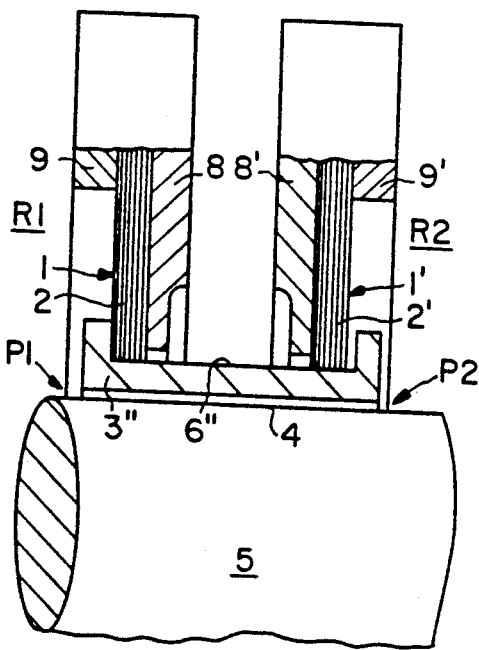
FIG. 4 is a partial sectional view along the longitudinal center axis of a turbo-engine of a third embodiment of the sealing device, showing a double secondary sealing device actuated by differential pressure in combination with a common sliding ring for primary sealing.

FIG. 1 shows a first embodiment of a sealing device between engine spaces R1, R2 which fluidically and/or aerodynamically are acted upon by different pressures. The present embodiment as well as the following embodiments of the invention according to FIG. 3 and 4 are suitable for turbo-engines, in this case, particularly for a gas turbo-engine, in which case at least one brush sealing device 1 is provided which is non-rotatably anchored on the stator side and the free bristle ends (bristles 2) of which sealingly project into a sliding ring 3 (secondary sealing). While leaving a radial gap 4 (primary sealing), the respective sliding ring 3 is arranged essentially coaxially with respect to the longitudinal axis—which is not shown in detail—of the respective engine shaft 5. Thus, according to the basic idea of the invention, the corresponding brush sealing device 1 is constructed as a radial sliding ring sealing device.

In a more precise interpretation of the above-mentioned basic idea of the invention, the free ends of the bristles 2, while forming a secondary sealing, are guided in a circumferential groove 6 of a sliding ring 3 which is divided radially at a circumferential point 7, the sliding ring 3 forming a self-centering primary sealing at the engine rotor 5 on the side facing away from the bristles 2.

Figure 2:
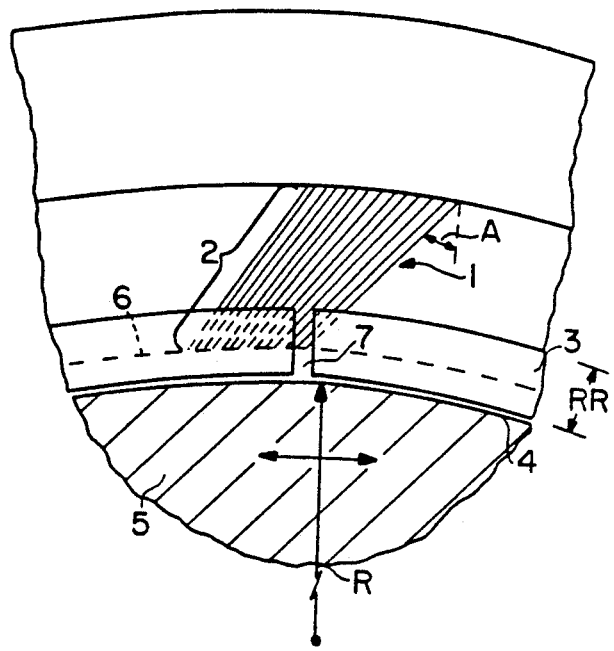
FIG. 2 is a sectional front face view of the device according to FIG. 1 together with an assigned cross-sectional part of the shaft.

It is a basis of the effective operation of the sealing device according to FIG. 1 and FIG. 2 that the fluid pressure or ambient pressure existing in space R1 in front of the sealing device is always higher than the pressure existing in space R2 behind the sealing device (P1>P2).

Advantageously, the bristles 2 of the brush sealing device 1 are to be constructed and arranged as a springing and damping combination.

The basis of an effective operation, particularly in view of relatively high differential pressures, should be that for the free ends of the bristles 2, such a bristle density or bristle overlapping is to be selected over the circumference that, in the inoperative position, the sliding ring 3 rests against the circumference of the engine rotor 5.

As shown in a further development, particularly in FIG. 2, the bristles 2 of the brush sealing device 1 are arranged at an angle with respect to an essentially axially symmetrical radial plane, in this case, for example the longitudinal center plane (FIG. 2) of the engine which bristle angle is sloped from the exterior top toward the interior bottom with the bristles supported axially and radially elastically at the sliding ring 3 by means of the free bristle ends.

FIGS. 1 and 2 show, among other things, that the inner ends of the bristles 2 are held on one side between a stationary, in this case, a rear sealing component 8 and a stator section 9 on the other side. The stator section 9 is in front in this case, this stator section 9 being arranged essentially concentrically with respect to the axis of and at a distance from the sliding ring 3.

FIGS. 1 and 2 show therefore that the bristles 2 of the brush sealing device 1 are pressed in axial direction against a contact surface of the stationary sealing component 8 by way of the sliding ring 3, under the effect of the differential pressure P1>P2 between the two engine spaces R1, R2. The inner end of component 8, together with the free bristle ends, projects into the circumferential groove 6, being axially and radially spaced away from the latter.

In preferred practical embodiments of the embodiment of FIGS. 1 and 2, the following dimensions are provided:

R = radius of shaft 5 = 20 mm to 80 mm
RR = radial width of ring 3 for the left shoulder = 3 to 10 mm (the right shoulder is similarly dimensioned or 1 to 3 mm smaller the ring 3 needs to be dimensioned to facilitate assembly)
A = angle of inclination of brush bristle 2 = 30° to 50°
GT = radial gap between shaft 5 and ring 3 = 0 at rest and increases upon shaft rotor rotation because of air bearing effects to approximately 0.05 mm
FE = unsupported free end length of bristles 2 = 0.5 to 2.0 mm
LB = length of bristles 2 from anchor point at stator = 7 mm to 20 mm
R9 = radius of stator section 9 = 30 to 100 mm Gap 7 = gap 7 in ring = 0.1–1.0 mm.

Correspondingly similar dimensions are provided for similar structure of the embodiments of FIGS. 3 and 4.

In a second embodiment of a sealing device according to the invention shown in FIG. 3, two labyrinth-type sliding rings 3, 3' are provided which are arranged at a distance from one another. A double brush sealing device 1, 1' is combined with the sliding rings 3, 3' which projects into the respective circumferential groove 6, 6' of the pertaining sliding ring 3, 3'. This therefore results in a double combination of the brush sealing device and the sliding ring sealing device. In this case, a stationary sealing component 8, 8' with a stator section 9, 9' is, in each case, with a mutual local surface contact, arranged non-rotatably connected with one another. Thus, in this case, the extreme ends of the bristles 2 of the brush sealing device 1 are locally and over the circumference gripped and held between the front stationary sealing component 9 and the rear stator section 8. This applies to the above-discussed embodiment according to FIG. 3 but also to the previously discussed embodiment according to FIG. 1. The respective radial gap sealing device according to FIG. 3 is therefore constructed between the respective sliding rings 3, 3' and the outer circumference of the engine rotor 5, specifically, by means of the respective primary sealing gaps 4, 4'.

According to FIG. 1 or FIG. 3, there is also the possibility of considering the brush anchoring on the stator side, thus the stationary sealing component 8, on the one side, and the ring-shaped stator section 9, on the other side, as a common structural unit, or to manufacture these stator components separately and then to connect them with one another in a suitable manner for the purpose of holding the extreme ends of the bristles 2.

FIG. 4 shows another variant of the invention, in which two stationary sealing components 8, 8' are held and arranged at a distance opposite one another and which engage in the circumferential groove 6" of a common sliding ring 3" in such a manner that the free ends of two brush sealing devices 1, 1' on one respective exterior side are held by the corresponding circumferential groove 6". During the operation, the sliding ring 3", by means of the differential pressure P1>P2, is pressed, in this case, against one 8 of the two stator sealing components 8, 8'.

According to the brush sealing concept (secondary sealing) located on the right-hand side in FIG. 4, in this case, as a result of the existing pressure difference P1>P2, during the operation, the brush sealing device 1' with the bristles 2' located on the right-hand side is pressed against the respective interior surface of the stationary sealing component (Plate) 8'.

According to a further basic variant, the invention provides a device which, by using one or several brushes, in addition to one or several sliding rings, is to form a radial aerodynamic air bearing. This advantageous basic variant is based on the following considerations concerning the state of the art.

Radial slide bearings and radial ball bearings consisting of an outer and an inner race, or also so-called "quasi-rigid" radial bearings have the disadvantage of a relatively low thermal compatability between the rotor, on the one side, and the stator, on the other side, or between two coaxial shafts of a, for example, multi-shaft turbo-jet engine for airplanes.

The above-mentioned problems concerning bearings also include the fact that an operationally caused relatively extensive excursion or swinging-out of the respective rotor shafts from the "normal" rotor shaft position is controlled relatively insufficiently.

Outer compressed-gas or pressure fluid cushions between the outer race and the adjacent stator or a shaft, which, among other things, have been suggested for the damping of vibrations, have an extremely complicated construction and, in general, are not sufficient to satisfactorily cope with extreme conditions, also with respect to temperature differences, rotor excursions or local wear of the bearings. In addition, for example, in the case of highly stressed ball bearings, additional special pressure circulating lubrications are known for a local temperature and wear reduction.

In order to avoid the mentioned disadvantages of the known art, a basic variant of the invention provides that, in addition to the above-mentioned characteristics, the brushes or bristles are elements which exclusively determine the stiffness, the suspension and the damping of an air bearing.

All embodiments according to FIGS. 1 to 4, in the above-described manner, may be assigned to this basic variant of an air bearing according to the invention to the extent that the respective bristles 2 of the brush sealing devices do not have to take over any so-called secondary sealing function. The concerned bristles 2 of the brush sealing devices 1 must therefore be selected only according to the criteria of the stiffness, the suspension and the damping of the bearing.

In an additional variant of the above-mentioned air bearing, there is also contemplated the possibility as explained and described by means of FIGS. 1 to 4, of providing a combination of an air bearing with the respective brush sealing devices 1; i.e., an advantageous combination of an air bearing, in addition to brush sealing devices, as secondary sealings, again with the embodiments shown and explained according to FIGS. 1 to 4, which contains spaces R1, R2 which are acted upon by a varying pressure P1 > P2 and are protected from one another by the corresponding sealing device.

What is claimed:

1. A sealing arrangement for sealing different pressure spaced from one another in a gas turbo engine of the like which has rotor means and stator means, comprising:
   at least one sliding ring means for surrounding the rotor means in a self centering manner to seal off a radial gap with respect to the rotor means,
   and at least one brush sealing means anchorable at the stator means with free brush bristle ends facing the rotor means and sealingly guidably supported at the at least one sliding ring means.

2. A sealing arrangement according to claim 1, wherein the at least one sliding ring means includes a slidable ring divided at one circumferential point, and wherein the free ends of the bristles are sealingly guided in a circumferential groove of the sliding ring.

3. A sealing arrangement according to claim 2, wherein, for the free ends of the bristles, an amount of bristle overlapping is selected which, over the circumference of the at least one brush sealing means, allows the sliding ring to rest against the circumference of the engine rotor in the inoperative position.

4. A sealing arrangement according to claim 2, wherein the bristles of the brush sealing means are arranged, with respect to an essentially axially symmetric radial plane of the engine, at an angle which is sloped from the exterior top toward the interior bottom, and with the free bristle ends, an axially and radially elastically supported at the sliding ring.

5. A sealing arrangement according to claim 2, wherein the bristles of the brush sealing means, by means of the sliding ring under the effect of the differential pressure (P1 > P2) between the two engine spaces (R1, R2), are pressed in axial direction against a contact surface of a stationary sealing component, a free inner end of said stationary sealing component being located in the circumferential groove together with the free bristle ends and is arranged to be axially and radially spaced away from said circumferential groove.

6. A sealing arrangement according to claim 2, further including a stationary sealing component, wherein the brush sealing means is held with respect to the inner ends of the bristles between the stationary sealing component on one side and a ring-shaped stator section on the other side, which stator section is arranged essentially concentrically to the axis of and at a distance from the sliding ring.

7. A sealing arrangement according to claim 1, wherein the bristles of the brush sealing means are constructed and arranged in a predetermined manner to exclusively define the stiffness, the suspension, and the damping characteristics of an air bearing.

8. A sealing arrangement according to claim 1, wherein at least two brush sealing means are provided following one another in the manner of a labyrinth at a distance to a pair sliding ring means, and wherein a stationary sealing component is in each case non-rotatably arranged with a stator section which follows with a mutual local contacting of surfaces.

9. A sealing arrangement according to claim 1, wherein at least two stationary sealing components, being opposite one another at a distance, engage in a circumferential groove of a common sliding ring means in such a manner that the free bristle ends of two of said brush sealing means are each held at an exterior side by the groove, the sliding ring being held against the corresponding one of the two stationary sealing components by means of the differential pressure (P1 > P2).

10. A sealing arrangement according to claim 1, further comprising:
   a plate mounting held against an inner surface of said at least one brush sealing means, a free inner end of said plate mounting being arranged axially and radially spaced away from a circumferential groove in said at least one sliding ring means.

11. A sealing arrangement according to claim 10, further comprising:
   a plate mounting held against an inner surface of said at least one brush sealing means, a free inner end of said plate mounting being arranged axially and radially spaced away from a circumferential groove in said at least one sliding ring means.

12. A sealing arrangement for sealing spaces with a fluid, gas or the like under different pressure from one another in a gas turbo engine or the like which has rotor means and stator means, comprising:
   at least one sliding ring surrounding the rotor means in a self centering manner to seal off a radial gap with respect to the rotor means,
   and at least one brush sealing means incorporating radially extending bristles anchorable at the stator means with its one set of ends and with its other set of ends facing the rotor means and being sealingly guidably supported in a circumferential groove of the at least one sliding ring, the at least one sliding ring being divided at one circumferential point, and during operation of the engine-being elastically disposed at the other ends of the bristles and providing a sealing cushion from the fluid at said gap.

* * * * *